United States Patent
Sato et al.

(10) Patent No.: US 6,391,423 B1
(45) Date of Patent: May 21, 2002

(54) MAGNETIC RECORDING MEDIUM

(75) Inventors: Satoshi Sato; Shinichi Matsumura, both of Miyagi (JP)

(73) Assignee: Sony Corporation, Tokyo (JP)

( * ) Notice: Subject to any disclaimer, the term of this patent is extended or adjusted under 35 U.S.C. 154(b) by 135 days.

(21) Appl. No.: 09/584,191

(22) Filed: May 31, 2000

(30) Foreign Application Priority Data

Jun. 4, 1999 (JP) ............................................ 11-158357

(51) Int. Cl.$^7$ ................................................ G11B 5/733
(52) U.S. Cl. ............. 428/141; 428/474.4; 428/694 SG; 428/900
(58) Field of Search .............................. 428/141, 474.4, 428/694 SG, 900

(56) References Cited

U.S. PATENT DOCUMENTS 5,202,810 A * 4/1993 Nakamura et al. .......... 360/135

* cited by examiner

Primary Examiner—Stevan A. Resan
(74) Attorney, Agent, or Firm—Sonnenschein, Nath & Rosenthal (57) ABSTRACT

A magnetic recording medium exhibiting satisfactory electromagnetic conversion characteristic and movement characteristics and incorporating a non-magnetic support member made of aromatic polyamide film. The magnetic recording medium incorporating a non-magnetic support member having a principal plane on which a magnetic layer constituted by at least a thin metal film is formed, wherein said non-magnetic support member has said principal plane on which at least said thin metal film is formed and on which small projections, the height of each of which is 10 nm to 40 nm from the central surface, are formed at a density of 1,000,000 pieces/mm$^2$ to 20,000,000 pieces/mm$^2$, and a bearing curve of the principal plane of said non-magnetic support member on which said small projection have been formed is such that the gradient of a straight line is −0.3 or smaller when a range of 10 nm in the upper portion is linearly approximated with a straight line by a least square approximation and the intercept is 10 nm to 40 nm.

4 Claims, 3 Drawing Sheets

MAGNETIC RECORDING MEDIUM

BACKGROUND OF THE INVENTION

1. Field of the Invention

The present invention relates to a magnetic recording medium incorporating a thin magnetic metal film. More particularly, the present invention relates to a magnetic recording medium for use as a video tape for performing a recording operation for a long time or a tape streamer having a large capacity.

2. Description of the Related Art

Hitherto, a magnetic recording medium in the form of a thin metal magnetic film incorporates a support member which is usually made of polyethylene terephthalate film. The reason for this lies in that the polyethylene terephthalate film has high strength and satisfactory dimension stability. In particular, a polyethylene terephthalate film having a thickness of about 7 $\mu$m to 10 $\mu$m is employed to form a home video tape, for example, 8 mm tape. A polyethylene terephthalate film having a thickness of about 5 $\mu$m to 7 $\mu$m is employed to form a tape streamer.

In recent years, the size of a DVC (Digital Video Cassette) tape, which is one of video cassette tapes, has been reduced. Also further long time recording is required. Enlargement of the capacity of the tape streamer, for example, D8 (data-8 mm) and DDS (Digital Data Storage), has been required.

Moreover, use under wide environment conditions (in particular, temperature and humidity conditions which are frequently changed), reliability in data preservation, stable recording and reproduction of data even in repeated use at high speed have been required.

To realize long time recording and enlargement of the capacity of the magnetic recording medium, the thickness of the base film must be reduced. When the thickness is reduced, there arises a problem of decrease in the stiffness and deterioration in the skew characteristic.

To realize required stiffness and the skew characteristic, contradictory characteristics, which are high strength and prevention against thermal shrinkage, must simultaneously be satisfied. Therefore, the strength of the polyethylene terephthalate film has been increased by performing re-orientation or the like. Moreover, aging has been performed to prevent thermal shrinkage. Since the thickness of the film has furthermore been reduced in recent years, the strength realized by the polyethylene terephthalate film has limitation. As a base film for a next-generation high density magnetic recording medium, an aromatic polyamide film has attracted attention because the aromatic polyamide film is free from considerable thermal shrinkage.

Since the recording time has been elongated and the capacity has been enlarged, the magnetic recording medium must meet furthermore severe requirements. That is, the magnetic recording medium must has a further improved electromagnetic conversion characteristic. Moreover, further reduction in the error rate has been required.

In view of the foregoing, it is preferable that the base film has a flat mirror surface which is free from any projection. An influence of the surface characteristic of the base film is, however, easily exerted on the surface characteristic of an evaporate film formed on the base film. Therefore, surface of the evaporated film formed on the base film maintains the mirror characteristic. Hence it follows that great friction occurs with respect to the magnetic head, causing the smooth movement of the evaporated surface to deteriorate. As a result, there arises a problem in that damage is sustained and the error rate is raised due to dust separated from the evaporated film.

SUMMARY OF THE INVENTION

In view of the foregoing, an object of the present invention is to provide a magnetic recording medium exhibiting both satisfactory electromagnetic conversion characteristic and durability against movement even if an aromatic polyamide film is employed to serve as the base film.

To achieve the foregoing object, according to one aspect of the invention, there is provided a magnetic recording medium comprising: a non-magnetic support member having a principal plane on which a magnetic layer constituted by at least a thin metal film is formed, wherein the non-magnetic support member has the principal plane on which at least the thin metal film is formed and on which small projections, the height of each of which is 10 nm to 40 nm from the central surface, are formed at a density of 1,000,000 pieces/mm$^2$ to 20,000,000 pieces/mm$^2$, and a bearing curve of the principal plane of the non-magnetic support member on which the small projection have been formed is such that the gradient of a straight line is −0.3 or smaller when a range of 10 nm in the upper portion is linearly approximated with a straight line by a least square approximation and the intercept is 10 nm to 40 nm.

The magnetic recording medium according to the present invention and structured as described above is arranged such that the density of the small projections which are formed on the principal plane of the non-magnetic support member, and the height of each of which from the central surface is 10 nm to 40 nm is specified. Moreover, the bearing curve of the principal plane of the non-magnetic support member on which the small projections have been formed is such that the gradient of a straight line realized when the range of 10 nm in the upper portion is approximated with a straight line by the least square approximation and the intercept are specified. The thin magnetic metal film is formed on the non-magnetic support member. Therefore, the principal plane of the thin magnetic metal film of the magnetic recording medium has a required flatness.

The bearing curve will now be described. The cross sectional shape of the surface is measured to produce a cross sectional curve indicating the cross sectional shape. Then, a portion of the cross sectional curve (having reference length E) is cut. The cut portion is cut along a cut line which is lowered from the vertex for a predetermined distance. The sum of the cut length of the cross sectional curve cut with the cut line is divided with the reference length E. The thus-obtained value for each cut line is indicated with percentage. The obtained curve is the bearing curve.

The central surface will now be described. A surface set such that the sum of squares of deviations of the distances from a rough curved surface is minimized is an average surface. When a cross section which is in parallel with the average surface of the rough curved surface has been formed, a surface having the areas each of which is enclosed by the foregoing cross section and the rough curved surface and which are the same between the two side portion of the cross section is the central surface.

The density of the small projections has been measured by using a so-called atomic force microscope (AFM). Specifically, an atomic force microscope (AFM) manufactured by Digital Instruments was used.

Other objects, features and advantages of the invention will be evident from the following detailed description of the preferred embodiments described in conjunction with the attached drawings.

DETAILED DESCRIPTION OF THE PREFERRED EMBODIMENTS

An embodiment of a magnetic recording medium according to the present invention will now be described with reference to the drawings.

Figure 1:
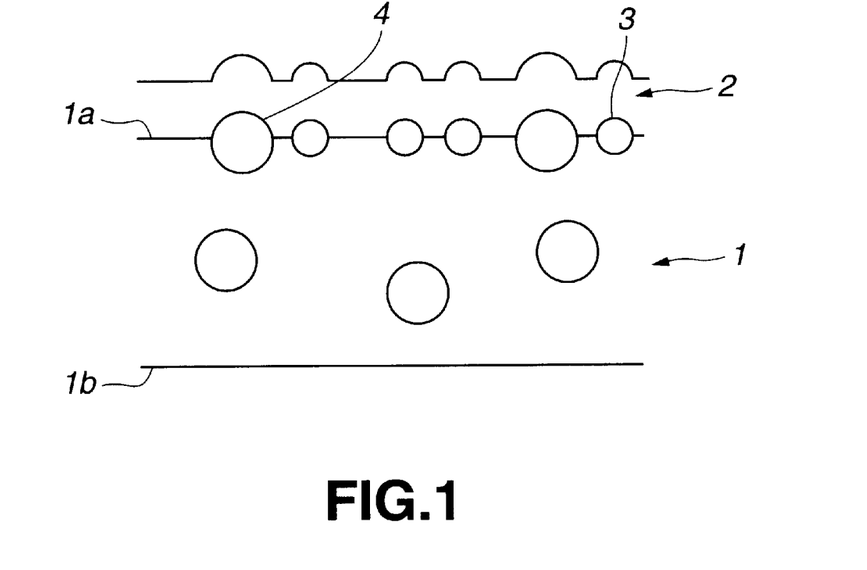
FIG. 1 is a schematic cross sectional view showing an essential portion of an example of a magnetic recording medium according to the present invention.

As shown in FIG. 1, the magnetic recording medium according to this embodiment constitutes a non-magnetic support member 1 and a magnetic layer 2 formed on a principal plane 1a of the non-magnetic support member 1 and constituted by a thin magnetic metal film.

The magnetic recording medium according to this embodiment incorporates small projections 3 and coarse projections 4 formed on the principal plane of the non-magnetic support member 1 thereof. The magnetic layer 2 is formed on the principal plane on which the small projections 3 and the coarse projections 4 have been formed. The density of small projections 3, which are formed on one principal plane of the non-magnetic support member 1 of the magnetic recording medium and, the height of each of which from the central surface is 10 nm to 40 nm is 1,000,000 pieces/mm² to 20,000,000 pieces/mm². A bearing curve of the principal plane of the non-magnetic support member 1 on which the small projection 3 have been formed is such that the gradient of a straight line is −0.3 or smaller when a range of 10 nm in the upper portion is approximated with a straight line by a least square approximation and the intercept is 10 nm to 40 nm.

Figure 2:
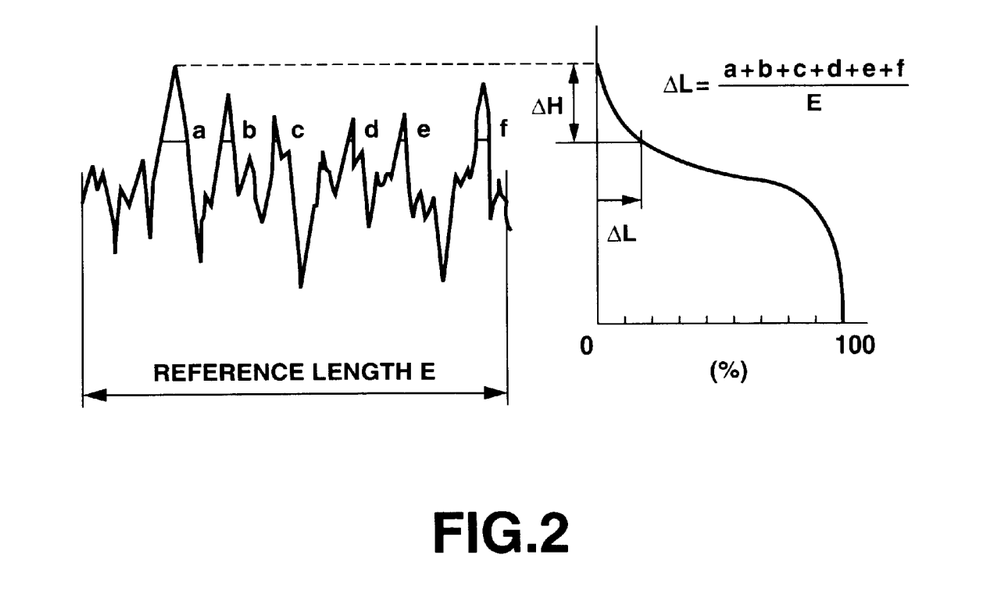
FIG. 2 is a graph showing a bearing curve indicating the characteristic of the cross sectional shape of the principal plane of a non-magnetic support member.

The bearing curve will now be described. The cross sectional shape of the surface is measured to produce a cross sectional curve indicating the cross sectional shape. Then, a portion of the cross sectional curve (having reference length E) is cut, as shown in FIG. 2. The cut portion is cut along a cut line which is lowered from the vertex for a predetermined distance. The sum of the cut length of the cross sectional curve cut with the cut line is divided with the reference length E. The thus-obtained value for each cut line is indicated with percentage. The obtained curve is the bearing curve. The concept of the bearing curve can be applied to the two-dimensional case and the three-dimensional case. The bearing curve is able to express the shapes of projections in accordance with the degree of change in the cut area. In this embodiment, the bearing curve has been produced from the sum of cross sectional areas obtained by cutting with the cutting surface and the measured area (5 μm×5 μm).

The central surface will now be described. A surface set such that the sum of squares of deviations of the distances from a rough curved surface is minimized is an average surface. When a cross section which is in parallel with the average surface of the rough curved surface has been formed, a surface having the areas each of which is enclosed by the foregoing cross section and the rough curved surface and which are the same between the two side portion of the cross section is the central surface.

The magnetic recording medium according to this embodiment has the structure that the surface characteristics of the non-magnetic support member 1 are specified as described above. Therefore, the non-magnetic support member 1 is constituted by, for example, an aromatic polyamide film. Moreover, the small particles are contained in the non-magnetic support member. Thus, the small projections 3 are formed on the principal plane.

The non-magnetic support member 1 constituted by the aromatic polyamide film is excellent in the physical properties including the tensile strength. Therefore, in case of the overall thickness is very thin, satisfactory durability can be obtained.

The non-magnetic support member 1 has a thickness of about 2.0 μm to about 5.0 μm and contains inactive particles. Since the non-magnetic support member 1 contains the inactive particles, required projections are formed on the principal plane 1a of the non-magnetic support member 1.

It is preferable that the aromatic polyamide film serving as the non-magnetic support member 1 contains aromatic polyamide expressed by the following formula (I) and/or (II) by 50 mol % or larger, more preferably by 70 mol % or larger.

(I)

(II)

where each of $Ar_1$, $Ar_2$ and $Ar_3$ is, for example, as follows:

wherein each of X and Y is selected from —O—, —CH₂—, —CO—, —SO₂—, —S— and —C(CH₃)₂—. Note that the present invention is not limited to the foregoing materials.

A substituent, for example, a halogen group (in particular, chlorine), a nitro group, an alkyl group (in particular, a methyl group) having one to three carbon atoms or an alkoxy group having one to three carbon atoms may be substituted for a portion of hydrogen atoms on the aromatic ring. Moreover, another substituent may be substituted for hydrogen in the amide bond constituting a polymer.

To increase rigidity, it is preferable that aromatic polyamide film is constituted by a polymer in which the structure in which the aromatic ring is bonded at the para position is not lower than 60% of the overall aromatic rings, more preferably not lower than 80%. To reduce moisture absorption, the aromatic polyamide film is constituted by a polymer having the following aromatic rings which are not lower than 30% of all of the aromatic rings. The aromatic rings are aromatic rings in which a substituent, for example, a halogen group (in particular, chlorine), a nitro group, an alkyl group (in particular, a methyl group) having one to three carbon atoms or an alkoxy group having one to three carbon atoms is substituted for a portion of hydrogen atoms on the aromatic ring.

The aromatic polyamide film may be a polymer which contains repeated units expressed by the foregoing formula (I) and/or formula (II) by 50 mol % or larger. Moreover, the residual portion not larger than 50 mol % is constituted by other repeated units, for example, aromatic polyimide units or other aromatic polyamide, which have been copolymerized or blended. It is preferable that all aromatic polyamide (aramid) is employed.

Moreover, the aromatic polyamide film constituting the non-magnetic support member 1 may have a composite structure. That is, the non-magnetic support member 1 may have a structure that a plurality of the aromatic polyamide films are laminated. In the foregoing case, the aromatic polyamide film constituting each layer must be made of the polymer expressed by the foregoing formulas. When the foregoing requirement is met, the layers have the same composition or the layers have different composition. From a viewpoint of improving the productivity, it is advantageous when the layers have the same composition.

To laminate the plural aromatic polyamide films, a plurality of raw material solutions for forming the layers are used to form a laminate by using a junction pipe or the inside portion of a connector as disclosed in Japanese Patent Laid-Open No. 56-162617.

To improve handing in a process for manufacturing the film magnetic recording medium, another principal plane $1b$ of the aromatic polyamide film opposite to the principal plane on which the magnetic metal film is formed may be roughened. Thus, the non-magnetic support member 1 produces required friction, causing handling to be facilitated.

When the aromatic polyamide film is manufactured, solution prepared by dissolving aromatic polyamide in N-methyl-2-pyrolidone (NMP) is flow-cast on a belt, the temperature of which is 100° C. to 200° C. Then, the solution on the belt is heated with hot air, the temperature of which is 100° C. to 250° C., to evaporate solvent. Thus, a film having self-holding characteristic is obtained. Then, the film is dried and heated while orienting the film in the lengthwise direction and the widthwise direction to 1.0 time to 2.0 times. Thus, an aromatic polyamide film can be manufactured.

At this time, the orienting ratio which is employed when the aromatic polyamide film is oriented in the lengthwise direction and the widthwise direction and the heat treatment conditions are adjusted. Thus, the Young's modulus of elasticity and the thermal shrinkage in the lengthwise direction and the widthwise direction can be controlled.

Specifically, it is preferable that the non-magnetic support member 1 has a thickness of 2.5 µm to 5.0 µm, a Young's modulus of elasticity of 1000 kg/mm$^2$ or higher in the lengthwise direction and a Young's modulus of elasticity of 1300 kg/mm$^2$ or higher in the widthwise direction. When the thickness and the Young's modulus of elasticity of the non-magnetic support member 1 are specified, required strength can be obtained. Moreover, the thickness of the magnetic recording medium can be reduced. Thus, recording time can be elongated and the recording capacity can be enlarged.

It is preferable that the non-magnetic support member 1 is added with inactive particles in order to improve handling facility in the process for manufacturing the magnetic recording medium or making the surface of the magnetic layer to have proper roughness so as to improve durability against movement of the magnetic recording medium.

Particles for forming the small projections 3 and the coarse projections 4 of the non-magnetic support member may be particles of an inorganic material, such as silica, calcium carbonate, titanium dioxide, alumina, kaoline, talc, graphite, feldspar, molybdenum dioxide, carbon black or barium nitrate; or particles of an organic material, such as polystyrene, polymethylmethacrylate, a methylmethacrylate copolymer, a crosslinked material of a methylmethacrylate copolymer, polytetrafluoroethylene, polyvinylidene fluoride, polyacrylonitrile or benzoguanamine resin. It is preferable that colloidal silica particles or crosslinked polymer particles are employed because spherical particles can easily be obtained.

Particles for forming the small projections 3 and the coarse projections 4 are deformed in an orienting process which is performed when the non-magnetic support member 1 is manufactured. Therefore, the hardness and the quantity of the particles to be added are changed to form the principal planes of the non-magnetic support member 1 into required shapes.

The small projections 3 and the coarse projections 4 of the non-magnetic support member 1 may be formed by forming a continuous film mainly composed of a soluble polymer and small particles on the principal plane of the non-magnetic support member 1 opposite to the principal plane on which the thin metal film is formed.

In the foregoing case, the soluble polymer is a polymer which is dissolved in water or formed into suspension or emulsion when a surface active agent or the like is added as necessary. A polymer obtained by crosslinking the foregoing polymer is included. The soluble polymer is exemplified by starch, cellulose derivative, such as methylcellulose or hydroxyethylcellulose, alginic acid, gum arabic, gelatin, sodium polyacrylate, polyacrylamide, polyvinyl alcohol, polyethylene oxide, polyvinylpyrolidone, polyvinyl chloride, polystyrene silicon resin, urethane resin, acrylic resin, ether resin, epoxy resin and ester resin.

The silicon resin may be mainly composed of polyorganosiloxane having substituents for siloxane which are mainly composed of methyl groups. In addition to the methyl groups, any one of the following materials is partially added as substituents: a hydroxyl group, an α-methylstyrene group, an oxyalkylene group, an unsaturated group, a chlorophenyl group, an amino group, a cyanoethyl group, an α-olefine group, a mercapto group and a hallogenated alkyl group. It is preferable that the foregoing group has a functional terminal group, such as an epoxy group, an amino group or hydroxyl group at each of the two ends thereof.

Organosiloxane can be aquated by emulsifying organosiloxane in water medium or by dissolving in water or by a known manufacturing method using aqueous emulsion obtained by emulsion polymerization.

The urethane resin may be aqueous urethane resin mainly composed of polyisocyanate, polyol, a chain-lengthening material and a crosslinking material. The aquation process is usually performed by using a material obtained by introducing a hydrophilic group into polyisocyanate, polyol and chain-lengthening material. As an alternative to this, an unreacted isocyanate group of polyurethane and a compound having a hydrophilic group may be allowed to react with each other.

The ether resin is exemplified by polyethylene glycol, polypropylene glycol, polytetramethylene glycol, a copolymer of ethylene oxide and propylene oxide and a copolymer of ethylene oxide and tetrahydrofuran.

The ester resin may be reactants of aromatic dicarboxylic acid, such as terephthalic acid or isophthalic acid, their ester forming derivatives, aliphatic carboxylic acid, such as adipic acid, azelaic acid or sebacic acid and their ester forming derivatives and diol, such as ethylene glycol, propylene glycol, 1,4-butanediol, 1,4-cyclohexane dimethanol, diethylene glycol or polyethylene glycol. When the acuation process is performed, a known method is employed with which a compound containing sulfonic groups is copolymerized together with the foregoing component. In the foregoing case, alkali metal salt, such as sulfoisophthalic acid, sulfoterephthalic acid, 4-sulfonaphthalene, 2,7-dicarboxylic acid or their ester forming derivative or alkali earth metal salt is frequently used.

Note that a hardening material may be added to the aqueous polymer as necessary.

In the present invention, the small projections 3 may be formed by adding an organic material which is the same type as the small particles contained in the non-magnetic support member 1 formed into a single layer and the aromatic polyamide film which is the raw material of the non-magnetic support member 1. The foregoing organic material is not dissolved in the solvent when the foregoing solution is prepared.

A thin magnetic metal film, which is formed into the magnetic layer 2, is formed on the principal plane 1$a$ of the non-magnetic support member 1. The thin magnetic metal film may be a thin magnetic metal film mainly composed of, for example, Co, Ni or Fe or a thin magnetic metal film mainly composed of their alloy. It is preferable that the thickness of the magnetic layer 2 constituted by the thin magnetic metal film is 0.05 $\mu$m to 0.2 $\mu$m, more preferably 0.1 $\mu$m to 0.2 $\mu$m. When the magnetic layer 2 is reduced, the self-demagnetization loss and the like can be reduced. Moreover, the overall thickness of the magnetic recording medium can be reduced as well as the reduction in the thickness of the non-magnetic support member 1. In addition, the overall length of the magnetic recording medium can be elongated. As a result, long-time recording and enlargement of the capacity can be realized.

Figure 3:
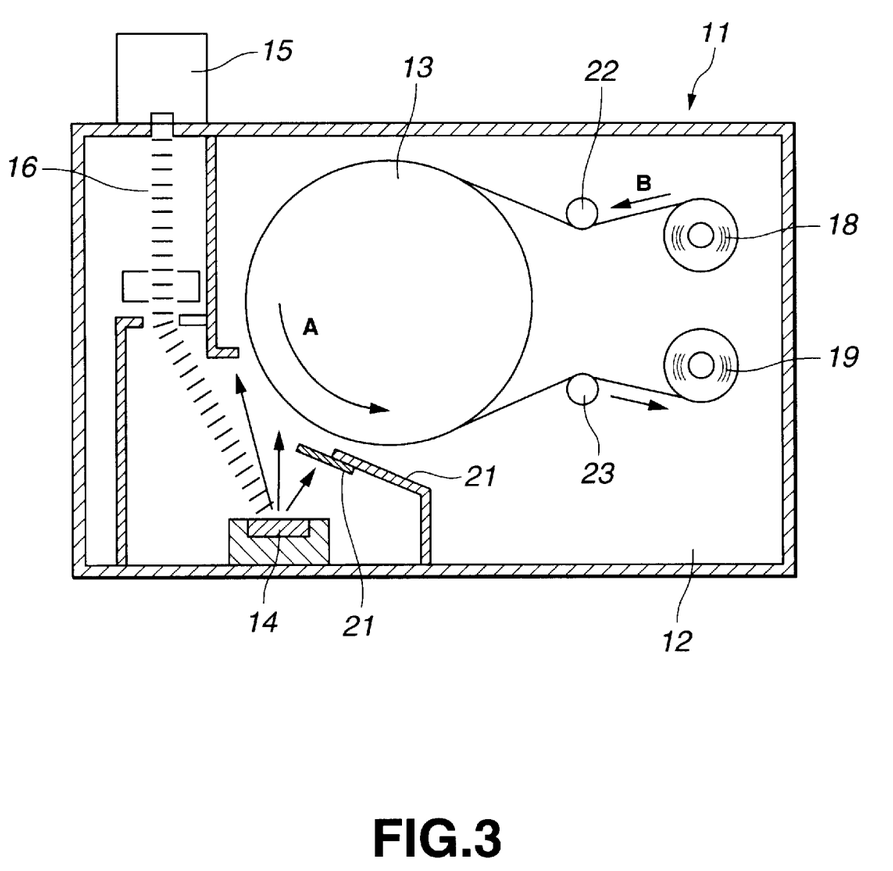
FIG. 3 is a diagram showing the structure of a continuous winding-type vacuum evaporation apparatus for forming a ferromagnetic thin metal film.

The magnetic metal film can be formed by, for example, a continuous winding type vacuum evaporating apparatus structured as shown in FIG. 3.

The vacuum evaporating apparatus 11 incorporates a vacuum chamber 12, the inside portion of which has been made to be vacuum about $10^{-3}$ (Pa). The vacuum chamber 12 includes a cooling can 13 which is cooled to about $-20°$ C. and arranged to rotate counterclockwise (in a direction indicated with an arrow A) in FIG. 3; and an evaporation source 14 disposed opposite to the cooling can 13 so as to form the magnetic metal film.

The evaporation source 14 incorporates a crucible in which ferromagnetic metal material, such as Co, is enclosed. The evaporation source 14 (the ferromagnetic metal material) is irradiated with an electron beam 16 which is accelerated and which is emitted from an electron-beam generating source 15. Thus, the ferromagnetic metal material is heated and evaporated, and delivered into a direction indicated with an arrow B from a supply roll 18 which is rotated counterclockwise when it is viewed in FIG. 3. Thus, the ferromagnetic metal material is allowed to be deposited on the non-magnetic support member 1 which moves along the outer surface of the cooling can 13. Thus, the magnetic metal film is formed. The non-magnetic support member 1 having the magnetic metal film formed thereon is wound around a winding roll 19.

An adhesion preventive plate 20 is disposed between the evaporation source 14 and the cooling can 13. A shutter 21 is provided for the adhesion preventive plate 20 such that the position of the shutter 21 can be adjusted. Thus, only evaporation particles which are made incident on the non-magnetic support member 1 at a predetermined angle are allowed to pass through. Thus, the above-mentioned oblique evaporation method is performed to form the magnetic metal film.

Guide rollers 22 and 23 are disposed between the supply roll 18 and the cooling can 13 and between the cooling can 13 and the winding roll 19. Thus, a predetermined tension is applied to the non-magnetic support member 1 which is moved from the supply roll 18 to the cooling can 13 and that moved from the cooling can 13 along the outer surface of the winding roll 19. Thus, the non-magnetic support member 1 can smoothly be moved.

When the magnetic metal film is evaporated, oxygen gas is supplied to the surface of the non-magnetic support member 1 through an oxygen gas introducing opening (not shown). Thus, the magnetic characteristics, durability and the weather resistance of the magnetic metal film can be improved. The evaporation source 14 can be heated by a known method, such as a resistance heating means, a high-frequency heating means or a laser heating means, as well as the heating means using the electron beam.

The example has been described with which the film is formed by using the ferromagnetic metal material composed of Co or the like by the oblique evaporating method. The film is formed by using the ferromagnetic metal material by another known thin-film forming method, such as a so-called PVD technique, for example, a vertical evaporation method or an ion plating method with which evaporation of the ferromagnetic metal material is performed in discharge. As an alternative to this, a sputtering method may be employed which is one of the PVD techniques and with which glow discharge is caused to occur in an atmosphere, the main component of which is argon, to cause generated argon ions to forcibly discharge atoms in the surface of the target. The ferromagnetic metal material may be Ni, Fe or their alloy as well as Co. To improve the adhesive strength with the non-magnetic support member 1, durability of the magnetic metal film and wear resistance, it is preferable that a magnetic metal film is employed which contains oxygen which can be obtained when the atmosphere is made to be an atmosphere in which oxygen gas is predominant at the time of performing the evaporation is performed.

When the thin magnetic metal film is formed, the adhesion strength with respect to the non-magnetic support member 1 or corrosion resistance and the wear resistance of the thin magnetic metal film must be improved. Thus, the film forming process is performed in an atmosphere in which oxygen gas is predominant.

A backcoat layer (not shown) may be formed on the principal plane opposite to the principal plane 1$a$ of the non-magnetic support member 1 on which the magnetic layer 2 is formed in order to improve the movement characteristics and durability. The backcoating layer may be made of a known material. For example, a material may be employed which is prepared by dispersing non-magnetic pigment, such as carbon or calcium carbonate, in a binder, such as polyurethane or vinyl chloride-vinyl acetate copolymer.

Figure 4:
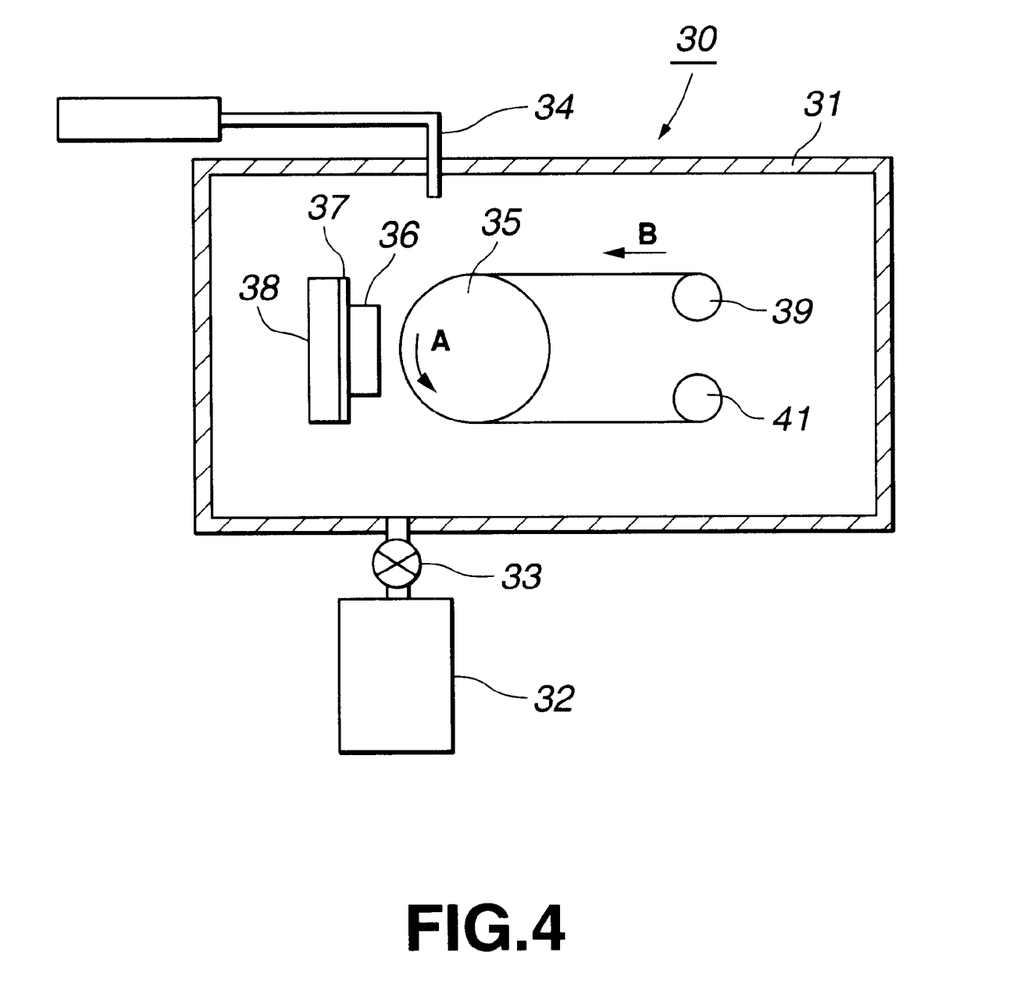
FIG. 4 is a schematic view showing the structure of a magnetron sputtering apparatus for forming a carbon protective film.

It is preferable that the magnetic recording medium is provided with a carbon protective film formed on the magnetic layer 2 by using a magnetron sputtering apparatus 30 structured as shown in FIG. 4 in order to improve the durability and weather resistance of the magnetic recording medium.

The magnetron sputtering apparatus 30 is covered with a chamber 31. The pressure in the chamber 31 is reduced to about $10^{-4}$ (Pa) by a vacuum pump 32. Then, the angle of a valve 33 for exhausting air to the vacuum pump 32 is reduced from a full-open state to 10°. Thus, the exhausting speed is reduced, and then Ar gas is introduced from a gas introducing pipe 34. Thus, the degree of vacuum is made to be about 0.8 Pa.

The magnetron sputtering apparatus 30 incorporates the chamber 31 which includes a cooling can 35 cooled to, for example, about −40° C. and arranged to rotate counterclockwise (in a direction indicated with an arrow A) when viewed in the drawing; and a target 36 disposed opposite to the cooling can 35.

The target 36 is a material of the carbon protective film. The target 36 is supported by a backing plate 37 constituting a cathode electrode. A magnet 38 is disposed on the reverse side of the backing plate 37. When the carbon protective film is formed by the magnetron sputtering apparatus 30, Ar gas is introduced from the gas introducing pipe 34. Moreover, voltage of about 3000 (V) is applied such that the cooling can 35 is used as the anode and the backing plate 37 is used as the cathode. Thus, a state in which an electric current of 1.4 A is maintained.

Since the voltage is applied, the Ar gas is formed into plasma. Thus, ionized ions collide with the target 36 so that atoms in the target 36 are forcibly discharged. Since the magnet 38 is disposed on the reverse side of the backing plate 37, a magnetic field is formed adjacent to the target 36. As a result, ionized ions are concentrated on the position adjacent to the target 36.

Atoms forcibly discharged from the target 36 adhere to the surface of the non-magnetic support member 1 which has been delivered in a direction indicated with an arrow B from the supply roll 39 which is rotated counterclockwise when viewed in the drawing, which moves along the outer surface of the cooling can 35 and on which the magnetic metal film 4 has been formed. Thus, the carbon protective film is formed. The non-magnetic support member 1, on which the carbon protective film has been formed, is wound around the winding roll 41.

It is preferable that the thickness of the carbon protective film is about 3 nm to 15 nm, more preferably about 6 nm to 10 nm to reduce spacing loss to prevent abrasion of the magnetic metal film 4.

Thus, the carbon protective film is formed by the magnetron sputtering method. The carbon protective film may be formed by another thin-film forming method, such as an ion beam sputtering method, an ion beam plating method or a CVD method.

When lubricant is added to the magnetic layer 2, the movement characteristic realized by the particle-shape projections of the magnetic material can be improved.

The right side, the reverse side, positions adjacent to the two sides of the magnetic recording medium, the inside portion (voids in the ferromagnetic thin metal film) of the magnetic layer 2, the interface between the non-magnetic support member 1 and the magnetic layer 2 and the inside portion of the non-magnetic support member 1 may be added with a variety of additives, such as rust preventives and an antistatic agent as necessary.

As described above, the magnetic recording medium according to this embodiment structured as described above incorporates the non-magnetic support member 1 structured such that the density of the small projections 3 formed on either principal plane of the non-magnetic support member 1 and having a height of 10 mn to 40 nm is specified. Moreover, the bearing curve of the principal plane of the non-magnetic support member on which the small projection have been formed is specified such that the gradient of a straight line and the intercept realized when a range of 10 nm in the upper portion is approximated with a straight line by a least square approximation. Therefore, the surface opposite to the magnetic head has the surface characteristics which are substantially the same as those of the principal plane of the non-magnetic support member 1.

The density of the small projections 3 formed on either principal plane of the non-magnetic support member 1 and each having a height of 10 nm to 40 nm is specified to satisfy a range from 1,000,000 pieces/mm$^2$ to 20,000,000 pieces/mm$^2$. When the density of the small projections 3 of the magnetic recording medium is lower than 1,000,000 pieces/mm$^2$, the surface of the magnetic recording medium is excessively smoothed. As a result, the movement characteristics deteriorate, the durability against movement deteriorates, scratches occur and the error rate is lowered owing to separation of dust of the evaporated film forming the magnetic layer. When the density of the small projections 3 is higher than 20,000,000 pieces/mm$^2$, the surface is excessively roughened. In the foregoing case, the electromagnetic conversion characteristic deteriorates.

The magnetic recording medium incorporating the non-magnetic support member 1 which has the principal plane on which the small projections 3 are formed is specified as follows: the bearing curve is used in such a manner that the gradient of the straight line when the range of 10 nm in the upper portion is linearly approximated is −0.3 or smaller and the intercept is 10 nm to 40 nm. It is preferable that the gradient of the straight line satisfies a range from −2.0 to −0.5. It is preferable that the intercept satisfies a range from 15 nm to 30 nm. When the gradient of the straight line of the magnetic recording medium is larger than −0.3, the shape of the projection is excessively broadened. Thus, the area of contact with the magnetic head is enlarged excessively. Thus, the surface of the magnetic recording medium is easily shaved. As a result, satisfactory durability against movement and a required friction coefficient cannot be realized. When the intercept is smaller than 10 nm, the projection is lowered. As a result, satisfactory durability against movement cannot be realized. When the intercept is larger than 40 nm, the spacing from the magnetic head is enlarged excessively to maintain a satisfactory electromagnetic conversion characteristic.

The magnetic recording medium has the structure that the density of the small projections 3 formed on the principal plane on which the thin metal film is formed and each having a height of 10 nm to 40 nm from the central surface is 1,000,000 pieces/mm$^2$ to 20,000,000 pieces/mm$^2$. Moreover, the bearing curve of the principal plane of the non-magnetic support member 1 on which the small projections 3 have been formed is such that the gradient of the straight line when a range of 10 nm of the upper portion is linearly approximated by the least square approximation is −0.3 or smaller. Moreover, the intercept is 10 nm to 40 mn. Therefore, satisfactory contact with the magnetic head can be maintained for a long time. As a result, the durability against movement can be improved and the electromagnetic conversion characteristic can be improved.

It is preferable that the density of the coarse projections 4 formed on either principal plane of the non-magnetic support member 1 and each of which has a height of 50 nm to 100 nm from the central surface is 5,000 pieces/mm² to 1,000,000 pieces/mm², more preferably 10,000 pieces/mm² to 100,000 pieces/mm². When the density of the coarse projections 4 of the magnetic recording medium is lower than 5,000 pieces/mm² or lower, the surface of the magnetic recording medium is smoothed excessively. Thus, the movement characteristics deteriorate, the durability against movement deteriorates and undesirable noise is produced from the tape. When the density of the coarse projections 4 is higher than 1,000,000 pieces/mm², the surface is excessively roughened. Thus, the spacing from the magnetic head is enlarged excessively, causing the electromagnetic conversion characteristic to deteriorate.

When the density of the coarse projections 4 formed on either principal plane of the non-magnetic support member 1 and each having the height of 50 nm to 100 nm from the central surface is specified as described above, excellent durability against movement and a satisfactory electromagnetic conversion characteristic can be realized.

It is preferable that the non-magnetic support member 1 of the magnetic recording medium is oriented in the lengthwise direction (in the MD direction) and the widthwise direction (in the TD direction) to adjust the Young's modulus of elasticity of the non-magnetic support member 1 in each of the lengthwise direction and the widthwise direction. Specifically, it is preferable that the Young's modulus of elasticity of the non-magnetic support member 1 in the lengthwise direction is 1000 kg/mm² or higher. Moreover, it is preferable that the Young's modulus of elasticity in the widthwise direction is 1300 pieces/mm² or higher. Since the Young's modulus of elasticity of the non-magnetic support member 1 in each of the lengthwise direction and the widthwise direction is specified, contact of the magnetic recording medium with the magnetic head can be improved.

It is preferable that the thickness of the non-magnetic support member 1 of the magnetic recording medium is reduced. Specifically, it is preferable that the thickness of the non-magnetic support member 1 is 2.0 µm to 5.0 µm. When the thickness of the non-magnetic support member 1 is smaller than 2.0 µm, there is apprehension that satisfactory rigidity of the magnetic recording medium cannot be realized. When the thickness of the non-magnetic support member 1 is larger than 5.0 µm, reduction in the overall thickness of the magnetic recording medium cannot easily be performed. Therefore, long-time recording cannot be performed. When the thickness of the non-magnetic support member 1 of the magnetic recording medium is specified to satisfy the above-mentioned range, the overall thickness of the magnetic recording medium can be reduced. As a result, long-time recording is permitted and satisfactory rigidity can be realized.

When a continuous film is formed, it is preferable that the thickness of the continuous film satisfies a range from 1 nm to 100 nm, more preferably 5 nm to 20 nm. When the thickness of the continuous film is smaller than 1 nm, there is apprehension that small particles are separated. When the thickness of the continuous film is larger than 100 nm, the surface is excessively roughened. There is apprehension that great noise is produced and the electromagnetic conversion characteristic deteriorates. When the continuous film is specified as described above, the small projections 3 can reliably be formed. Moreover, an excellent electromagnetic conversion characteristic can be realized.

The density of each of the small projections 3 and the coarse projections 4 was measured by using an atomic force microscope (AFM)(manufactured by Digital Instruments) and a scanning electron microscope (SEM)(high-resolution COLD FE-SEM S-900 (trade name of Japan Electron Optics)). The measurement was performed under conditions that the accelerated voltage was 2 kV to 20 kV and the magnification was 5,000 times to 30,000 times. The density was expressed by a converted value of the number of pieces per 1 mm².

The Young's modulus of elasticity of the non-magnetic support member 1 was measured by using a tensilon-type tension testing machine at 25° C. and 55%RH.

EXAMPLES

Examples and comparative examples of the magnetic recording medium will now be described to describe the present invention. A variety of physical properties in the examples were measured by the following methods.

Measurement of Young's Modulus of Elasticity of Aromatic Polyamide Film

The Young's modulus of elasticity of the non-magnetic support member 3 was measured by using a tensilon-type tension testing machine under conditions that the temperature was 25° C. and the relative humidity was 55%.

Density of Small Projections and Bearing Curve

The surface of either principal plane of the non-magnetic support member on which the magnetic metal film was formed was measured by using an atomic force microscope Nano. ScpoeIII (Digital Instruments). An area 5 µm×5 µm was measured, the accelerated voltage was 20 kV and the magnification was 30,000 time. Projections each having a height not lower than 10 nm from the central surface were counted so as to be converted to the number per 1 mm². Thus, the density was detected. In accordance with obtained data, the bearing curve of the surface constituted by the small projections was obtained.

Density of Coarse Projections

The surface of either principal plane of the non-magnetic support member on which the magnetic metal film was formed was measured by using the high-resolution COLD FE-SEM S-900 (trade name of Japan Electron Optics). An area 5 µm×5 µm was measured, the accelerated voltage was 2 kV and the magnification was 5,000 time. Projections each having a height of not lower than 50 nm from the central surface were counted so as to be converted to the number per 1 mm². Thus, the density was detected.

Young's Modulus of Elasticity

The tension testing machine was used under conditions that the temperature was 25° C. and the relative humidity was 55%.

Characteristics of Tape

The characteristics of the magnetic recording medium were evaluated in the examples and comparative example by using a AIT drive SDX-S300C (trade name of SONY) which was modified to perform the evaluation. The recording operations were performed at a relative speed of 10.04 m/sec and the shortest recording wavelength of 0.35 µm.

Output (Electromagnetic Conversion Characteristic)

Assuming that the output of a marketed AIT drive was 0 dB, relative output levels were obtained. Results not lower than −1.0 dB were determined allowable.

Durability against Movement

A magnetic tape having a length of 10 cm was repeatedly used in recording operations and reproducing operations. The number of times at which no output was obtained was counted. Results larger than 5,000 times were determined allowable.

Block Error Rate

A magnetic tape having a length of 170 m was moved and passed 100 times. Then, a block error rate and a block error rate after 100 times of movement and passing were measured. Results not higher than $10^{-2}$ were determined allowable.

Example 1

Initially, a non-magnetic support member was manufactured as follows.

Initially, 2-chloro-p-phenylenediamine corresponding to a molar ratio of 0.9 mol and 4,4-diaminophenylsulfon corresponding to a molar ratio of 0.1 mol were stirred and dissolved in dehydrated n-methylpyrolidone. Then, the solution was cooled. Then, chloride terephthalate corresponding to a molar ratio of 0.7 mol was added to the solution, and then the solution was stirred for about two hours. Thus, polymerization was completed. Then, the solution was neutralized and stirred by using sufficiently refined calcium hydroxide. Thus, aromatic polyamide solution was prepared.

The aromatic polyamide solution was flow-cast on a metal drum having the surface polished at 30° C. Then, the solution was heated with hot air, the temperature of which was 120° C., for 10 minutes. Thus, solvent was evaporated so that a film having the self-holding characteristic was continuously separated from the belt.

Then, while continuously immersing the film in a water tank, the temperature of which was 30° C., the film was oriented 1.1 time in the lengthwise direction of the film. Then, the film was introduced into a tenter so as to orient the film 1.3 time at 320° C. in the widthwise direction of the film. Thus, a non-magnetic support member was obtained which had a Young's modulus of elasticity of 1000 kg/mm² in the lengthwise direction, a Young's modulus of elasticity of 1300 kg/mm² in the widthwise direction and the thickness of 4 $\mu$m.

Then, a coating material for a soluble polymer film was prepared to have the following composition.

Preparation of Coating Material for Soluble Polymer Film

| $SiO_2$ (particle size: 20 nm) | 0.006 parts by weight |
| acrylic polyester resin (1.5 wt %) | 82 parts by weight |

The prepared coating material for a polymer film was applied to the principal plane of the non-magnetic support member on which the magnetic layer was formed at a rate of 4.5 g/m². Then, the principal plane was dried so that a polymer film was formed.

The thus-manufactured non-magnetic support member was used to manufacture an original material for a magnetic tape by the following method.

That is, the vacuum evaporating apparatus 11 shown in FIG. 3 was exhausted such that its inside portion was made to be vacuum of about $10^{-3}$ (Pa). The non-magnetic support member was introduced into the vacuum evaporating apparatus 11. Then, a continuous, vacuum and oblique evaporation method was employed to form a magnetic metal film made of Co on the principal plane 1a of the non-magnetic support member in the presence of oxygen in a small quantity. The angle of incidence of the material to be evaporated was limited to 90° to 45° in the normal direction of the non-magnetic support member. To make the movement speed of the non-magnetic support member to be 50 m/minute and the thickness of the magnetic metal film to be 180 nm, the intensity of the electron beam was adjusted in the manufacturing process.

Then, the pressure in the magnetron sputtering apparatus structured as shown in FIG. 4 was reduced to about $10^{-4}$ (Pa). Then, Ar gas was introduced to make the pressure to be about 0.8 Pa. Then, the non-magnetic support member having the magnetic metal film formed thereon was introduced into the magnetron sputtering apparatus. The non-magnetic support member was moved along the outer surface of the cooling can cooled to −40° C. at speed of 5 m/minute. Thus, a carbon protective film having a thickness of 5 nm was formed on the magnetic metal film.

Then, organic rust preventives in a quantity of 0.1 wt % was applied to the carbon protective film by using an applying machine incorporating a gravure roll. The carbon protective film was dried by a drier set to 100° C. Then, 0.5 wt % solution mainly composed of an organic material composed of perfluoropolyether derivative serving as the lubricant was similarly applied by operating the gravure roll. Then, the film was dried. The obtained film was used as a top coat layer.

Then, a back coating material having the following composition was prepared.

Composition of Back Coating Material

| carbon black | 100 parts by weight |
| polyurethane resin | 50 parts by weight |
| ester acrylate oligomer | 20 parts by weight |
| diethylene glycol diacrylate | 20 parts by weight |
| butoxy ethylacrylate | 20 parts by weight |
| methylethyl ketone 80% and toluene 20% | 300 parts by weight |

The prepared back coating material was applied to the surface of the non-magnetic support member opposite to the surface on which the magnetic metal film was formed. Then, the surface was dried so that a backcoat layer having a thickness of 0.5 $\mu$m was formed.

A tape original material incorporating the non-magnetic support member on which the magnetic metal film and the backcoat layer were formed was cut to have a width of 8 mm. Then, the tape was accommodated in a cassette case so that a cassette tape was manufactured.

Example 2

In Example 2, a cassette tape was manufactured by performing a process similar to Example 1 except for the composition of the coating material for forming a polymer film arranged as follows:

Composition of Coating Material for Forming Soluble Polymer

| $SiO_2$ (particle size: 20 nm) | 0.012 parts by weight |
| acrylic polyester resin (1.5 wt %) | 82 parts by weight |

Example 3

In Example 3, a cassette tape was manufactured by performing a process similar to Example 1 except for the composition of the coating material for forming a polymer film arranged as follows:

Composition of Coating Material for Forming Soluble Polymer

| | |
|---|---|
| SiO₂ (particle size: 20 nm) | 0.040 parts by weight |
| acrylic polyester resin (1.5 wt %) | 82 parts by weight |

Example 4

In Example 4, a cassette tape was manufactured by performing a process similar to Example 1 except for the composition of the coating material for forming a polymer film arranged as follows:
Composition of Coating Material for Forming Soluble Polymer

| | |
|---|---|
| SiO₂ (particle size: 20 nm) | 0.008 parts by weight |
| acrylic polyester resin (1.5 wt %) | 82 parts by weight |

Example 5

In Example 5, a cassette tape was manufactured by performing a process similar to Example 1 except for the composition of the coating material for forming a polymer film arranged as follows:
Composition of Coating Material for Forming Soluble Polymer

| | |
|---|---|
| SiO₂ (particle size: 20 nm) | 0.040 parts by weight |
| acrylic polyester resin (1.5 wt %) | 82 parts by weight |

Example 6

In Example 6, a cassette tape was manufactured by performing a process similar to Example 1 except for particles which were added to the non-magnetic support member. The particles were the same type as aromatic polyamide resin which was the raw material of the non-magnetic support member and which were made of a polyamide organic material which was not dissolved in solvent when aromatic polyamide solution was prepared.

Example 7

In Example 7, a cassette tape was manufactured by performing a process similar to Example 1 except for particles which were added to the non-magnetic support member. The particles were the same type as aromatic polyamide resin which was the raw material of the non-magnetic support member, which were made of an organic material which was not dissolved in solvent when aromatic polyamide solution was prepared and which had hardness which was 1.5 time that of the organic material according to Example 6.

Example 8

In Example 8 the conditions under which the non-magnetic support member was oriented were changed to conditions that the orientation was performed at 1.15 time in the lengthwise direction of the film and 1.6 time in the widthwise direction. Thus, the Young's modulus of elasticity in the lengthwise direction of the film was made to be 1200 kg/mm² and that in the widthwise direction was made to be 1600 kg/mm².

Comparative Example 1

In Comparative Example 1, a cassette tape was manufactured by performing a process similar to Example 1 except for the composition of the coating material for forming a polymer film arranged as follows:
Composition of Coating Material for Forming Soluble Polymer

| | |
|---|---|
| SiO₂ (particle size: 30 nm) | 0.0004 parts by weight |
| acrylic polyester resin (1.5 wt %) | 82 parts by weight |

Comparative Example 2

In Comparative Example 2, a cassette tape was manufactured by performing a process similar to Example 1 except for the composition of the coating material for forming a polymer film arranged as follows:
Composition of Coating Material for Forming Soluble Polymer

| | |
|---|---|
| SiO₂ (particle size: 20 nm) | 0.040 parts by weight |
| acrylic polyester resin (1.5 wt %) | 82 parts by weight |

Comparative Example 3

In Comparative Example 3, a cassette tape was manufactured by performing a process similar to Example 1 except for the composition of the coating material for forming a polymer film arranged as follows:
Composition of Coating Material for Forming Soluble Polymer

| | |
|---|---|
| SiO₂ (particle size: 20 nm) | 0.040 parts by weight |
| acrylic polyester resin (1.5 wt %) | 82 parts by weight |

Comparative Example 4

Comparative Example 4, a cassette tape was manufactured by performing a process similar to Example 1 except for the composition of the coating material for forming a polymer film arranged as follows:
Composition of Coating Material for Forming Soluble Polymer

| | |
|---|---|
| SiO₂ (particle size: 20 nm) | 0.020 parts by weight |
| acrylic polyester resin (1.5 wt %) | 82 parts by weight |

Comparative Example 5

In Comparative Example 5, a cassette tape was manufactured by performing a process similar to Example 1 except for the composition of the coating material for forming a polymer film arranged as follows:

Composition of Coating Material for Forming Soluble Polymer

| | |
|---|---|
| SiO$_2$ (particle size: 20 nm) | 0.040 parts by weight |
| acrylic polyester resin (1.5 wt %) | 82 parts by weight |

Comparative Example 6

In Comparative Example 6, a cassette tape was manufactured by performing a process similar to Comparative Example 3 except for particles which were added to the non-magnetic support member. The particles were the same type as aromatic polyamide resin which was the raw material of the non-magnetic support member and which were made of a polyamide organic material which was not dissolved in solvent when aromatic polyamide solution was prepared.

Comparative Example 7

In Comparative Example 7, a cassette tape was manufactured by performing a process similar to Example 1 except for particles which were added to the non-magnetic support member. The particles were the same type as aromatic polyamide resin which was the raw material of the non-magnetic support member, which were made of an organic material which was not dissolved in solvent when aromatic polyamide solution was prepared and which had hardness which was 1/10 time that of the organic material according to Example 6.

Comparative Example 8

In Comparative Example 8, a cassette tape was manufactured by performing a process similar to Example 1 such that the conditions under which the non-magnetic support member was oriented were changed to conditions that the orientation was performed at 0.9 time in the lengthwise direction of the film and 1.1 time in the widthwise direction. Thus, the Young's modulus of elasticity in the lengthwise direction of the film was made to be 900 kg/mm$^2$ and that in the widthwise direction was made to be 900 kg/mm$^2$.

Evaluation of Characteristic

The physical properties and characteristics of Examples 1 to 8 and Comparative Examples 1 to 8 were evaluated. Results were shown in Table 1.

TABLE 1

| | Small Projections | | | Coarse Projections |
|---|---|---|---|---|
| | AFM Density (pieces/mm$^2$) | Gradient | Intercept (nm) | SEM Density (pieces/mm$^2$) |
| Example 1 | 100 | −1.5 | 10 | 5 |
| Example 2 | 300 | −1.2 | 15 | 5 |
| Example 3 | 700 | −1.0 | 20 | 5 |
| Example 4 | 2000 | −1.0 | 30 | 5 |
| Example 5 | 700 | −1.0 | 20 | 100 |
| Example 6 | 700 | −0.5 | 20 | 5 |
| Example 7 | 700 | −0.7 | 25 | 5 |
| Example 8 | 700 | −1.0 | 20 | 5 |
| Comparative Example 1 | 50 | −1.0 | 20 | 5 |
| Comparative Example 2 | 400 | −0.2 | 17 | 5 |
| Comparative Example 3 | 700 | −1.0 | 50 | 5 |
| Comparative Example 4 | 5000 | −0.2 | 17 | 5 |
| Comparative Example 5 | 700 | −1.0 | 20 | 200 |
| Comparative Example 6 | 700 | −0.2 | 20 | 5 |
| Comparative Example 7 | 700 | −0.1 | 10 | 5 |
| Comparative Example 8 | 700 | −1.0 | 20 | 5 |

TABLE 1-continued

| | Young's Modulus of Elasticity (kg/mm$^2$) | | Output |
|---|---|---|---|
| | MD | TD | (dB) |
| Example 1 | 1000 | 1300 | +1.5 |
| Example 2 | 1000 | 1300 | +1.0 |
| Example 3 | 1000 | 1300 | +0.2 |
| Example 4 | 1000 | 1300 | −0.3 |
| Example 5 | 1000 | 1300 | −0.4 |
| Example 6 | 1000 | 1300 | 0 |
| Example 7 | 1000 | 1300 | 0 |
| Example 8 | 1200 | 1600 | +0.4 |
| Comparative Example 1 | 1000 | 1300 | +1.0 |
| Comparative Example 2 | 1000 | 1300 | +0.4 |
| Comparative Example 3 | 1000 | 1300 | −1.2 |
| Comparative Example 4 | 1000 | 1300 | −1.8 |
| Comparative Example 5 | 1000 | 1300 | −2.6 |
| Comparative Example 6 | 1000 | 1300 | −3.0 |
| Comparative Example 7 | 1000 | 1300 | 0 |
| Comparative Example 8 | 900 | 1000 | −2.4 |

| | Durability against Movement | Block Error Rate | |
|---|---|---|---|
| | (times) | after one pass | after 100 passes |
| Example 1 | >5000 | 1 × 10$^{-3}$ | 6 × 10$^{-3}$ |
| Example 2 | >5000 | 2 × 10$^{-3}$ | 5 × 10$^{-3}$ |
| Example 3 | >5000 | 2 × 10$^{-3}$ | 4 × 10$^{-3}$ |
| Example 4 | >5000 | 3 × 10$^{-3}$ | 5 × 10$^{-3}$ |
| Example 5 | >5000 | 2 × 10$^{-3}$ | 5 × 10$^{-3}$ |
| Example 6 | >5000 | 2 × 10$^{-3}$ | 7 × 10$^{-3}$ |
| Example 7 | >5000 | 2 × 10$^{-6}$ | 6 × 10$^{-3}$ |
| Example 8 | >5000 | 2 × 10$^{-3}$ | 4 × 10$^{-3}$ |
| Comparative Example 1 | 100 | 4 × 10$^{-3}$ | 4 × 10$^{-2}$ |
| Comparative Example 2 | 100 | 4 × 10$^{-3}$ | 6 × 10$^{-2}$ |
| Comparative Example 3 | >5000 | 4 × 10$^{-3}$ | 9 × 10$^{-3}$ |
| Comparative Example 4 | 300 | 6 × 10$^{-3}$ | 2 × 10$^{-2}$ |
| Comparative Example 5 | >5000 | 4 × 10$^{-3}$ | 4 × 10$^{-2}$ |
| Comparative Example 6 | 500 | 2 × 10$^{-3}$ | 5 × 10$^{-3}$ |
| Comparative Example 7 | 1000 | 2 × 10$^{-3}$ | 1 × 10$^{-2}$ |
| Comparative Example 8 | 3000 | 2 × 10$^{-3}$ | 5 × 10$^{-2}$ |

As can be understood from Table 1, Examples 1 to 8 resulted in the electromagnetic conversion characteristic being −0.4 dB or higher, the durability against movement being 5,000 times without exception and low block error rates. Each of Examples 1 to 8 was structured such that the non-magnetic support member 1 was constituted by the aromatic polyamide film having the thickness of 2.5 µm to 5.0 µm and the Young's modulus of elasticity of 1000 kg/mm² or higher in the lengthwise direction and 1300 kg/mm² or higher in the widthwise direction. The small projections 3 having heights of 10 nm to 40 nm from the central surface were formed on the surface on which the magnetic layer 2 was formed at a density satisfying a range from 1,000,000 pieces/mm² to 20,000,000 pieces/mm². The coarse projections 4 having the height of 50 nm to 100 nm from the central surface were formed to satisfy the range from 1,000 pieces/mm² to 1,000,000 pieces/mm². Moreover, the gradient of the bearing curve of the surface realized by the small projections 3 which was obtained by approximating the range of 10 nm in the upper portion of the bearing curve with a straight line was −0.3 or smaller and the intercept satisfied 10 nm to 40 nm.

Comparative Example 1 incorporating the small projections 3 formed at the low density encountered deterioration in the durability against movement in spite of satisfactory output. Moreover, the block error rate was raised excessively.

Comparative Example 2was structured such that the gradient of the straight line obtained by approximating the range of 10 nm of the upper portion of the bearing curve was larger than −0.3. Since the broad small projections 3 were formed, the area of contact with the magnetic head was enlarged. Thus, the surface of the magnetic layer 2 was easily shaved, causing durability against movement to deteriorate. Also the block error rate was raised excessively.

Comparative Example 3 was structured such that the intercept of the straight line obtained by approximating the range of 10 nm of the upper portion of the bearing curve was larger than 40 nm. Thus, the spacing from the magnetic head was enlarged, causing the output to be reduced.

Comparative Example 4 incorporated small projections 3 formed at an excessively high density. Therefore, the surface of the magnetic layer 2 was excessively roughened. Moreover, the area of contact with the magnetic head was enlarged, causing the surface of the magnetic layer 2 to easily be shaved. As a result, both of the output and the durability against movement deteriorated.

Comparative Example 5 encountered the enlargement of the spacing because the projections were formed densely. Thus, the output deteriorated.

Comparative Example 6 incorporated the non-magnetic support member 1 to which particles were added which were the same type as the aromatic polyamide resin which was the raw material of the non-magnetic support member 1. The particles were made of the organic material which was not dissolved in solvent when the aromatic polyamide solution was prepared. Thus, the gradient of the straight line obtained by approximating the range of 10 nm of the upper portion of the bearing curve was larger than −0.3. Therefore, broad projections were formed, causing the area of contact with the magnetic head to be enlarged. Moreover, the durability against movement deteriorated. Moreover, the block error rate was raised excessively owing to separation of dust occurring due to shaving of the surface of the tape.

Comparative Example 7 incorporated the non-magnetic support member 1 to which particles were added which were made of the same material as the aromatic polyamide resin which was the raw material of the non-magnetic support member 1. The particles were made of the organic material which was not dissolved in solvent when the aromatic polyamide solution was prepared and which had low hardness. Therefore, the gradient of the straight line obtained by approximating the range of 10 nm of the upper portion of the bearing curve was larger than −0.3. Therefore, broad projection were formed. As a result, the area of contact with the magnetic head was enlarged, causing the durability against movement to deteriorate. Moreover, the block error rate was raised excessively owing to separation of the dust caused from shaving of the surface of the tape.

Comparative Example 8 was structured such that the Young's modulus of elasticity in the lengthwise direction of the film was 900 kg/mm² and that in the widthwise direction was 900 kg/mm². Since the Young's modulus of elasticity in each of the lengthwise direction and the widthwise direction was too small, sufficient contact with the magnetic head was not realized. As a result, results of the output, the durability against movement and the block error rate were unsatisfactory.

Therefore, Examples 1 to 8 were structured such that the non-magnetic support member 1 was constituted by the aromatic polyamide film having the thickness of 2.5 µm to 5.0 µm and the Young's modulus of elasticity of 1000 kg/mm² or higher in the lengthwise direction and 1300 kg/mm² or higher in the widthwise direction. The small projections 3 having heights of 10 mn to 40 nm from the central surface were formed on the surface on which the magnetic layer 2 was formed at a density satisfying a range from 1,000,000 pieces/mm² to 20,000,000 pieces/mm². The coarse projections 4 having the height of 50 nm to 100 nm from the central surface were formed to satisfy the range from 1,000 pieces/mm² to 1,000,000 pieces/mm². Moreover, the gradient of the bearing curve of the surface realized by the small projections 3 which was obtained by approximating the range of 10 nm in the upper portion of the bearing curve with a straight line was −0.3 or smaller and the intercept satisfied 10 nm to 40 nm. As a result, a magnetic recording medium exhibiting an excellent electromagnetic conversion characteristic and satisfactory durability against movement was obtained.

As described above, the magnetic recording medium according to the present invention is arranged such that the density of the small projection which are formed on a principal plane of a non-magnetic support member, and the height of each of which from the central surface is 10 nm to 40 nm is specified. Moreover, the bearing curve of the principal plane of the non-magnetic support member on which the small projections have been formed is such that the gradient of a straight line realized when the range of 10 nm in the upper portion is approximated with a straight line by the least square approximation and the intercept are specified.

Therefore, the magnetic recording medium according to the present invention is able to realize both of a satisfactory electromagnetic conversion characteristic and excellent durability against movement. As a result, the error rate can be reduced.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magnetic recording medium comprising:
   a non-magnetic support member having a principal plane on which a magnetic layer constituted by at least a thin metal film is formed, wherein said non-magnetic support member has said principal plane on which at least said thin metal film is formed and on which small projections, the height of each of which is 10 nm to 40 nm from the central surface, are formed at a density of 1,000,000 pieces/mm² to 20,000,000 pieces/mm², and a bearing curve of the principal plane of said non-magnetic support member on which said small projection have been formed is such that the gradient of a straight line is −0.3 or smaller when a range of 10 nm in the upper portion is linearly approximated with a straight line by a least square approximation and the intercept is 10 nm to 40 nm.

2. A magnetic recording medium according to claim 1, wherein the density of the coarse projections formed on either principal plane of the non-magnetic support member on which said thin metal film is formed and having a height of 50 nm to 100 nm from the central surface is 5,000 pieces/mm² to 1,000,000 pieces/mm².

3. A magnetic recording medium according to claim 1, wherein said non-magnetic support member incorporates an aromatic polyamide film and a continuous film formed on said aromatic polyamide film and containing small particles.

4. A magnetic recording medium according to claim 3, wherein said aromatic polyamide film has a Young's modulus of elasticity of 1000 kg/mm² or larger in the lengthwise direction thereof and 1300 kg/mm² or larger in the widthwise direction thereof.

* * * * *